Patented May 18, 1937

2,080,430

UNITED STATES PATENT OFFICE 2,080,430

PRODUCT FOR STIMULATING BLOOD CELL FORMATION AND METHOD OF MAKING IT

Roger S. Morris and John H. Foulger, Cincinnati, Ohio, assignors to The Wm. S. Merrell Company, Cincinnati, Ohio, a corporation of Ohio No Drawing. Application February 27, 1934, Serial No. 713,129

6 Claims. (Cl. 167—74)

The present invention relates to the production and/or isolation from natural sources of a factor or factors which display unusual activity in beneficially altering the blood picture in diseases and/or conditions that are attended by abnormal red and/or white blood cell formation and has for an object the provision of such factor or factors as a therapeutic agent of practical value for the purposes stated and of a method of making it.

These and other objects which will be hereinafter noted are attained by the means and method hereinafter described.

Much of the work of the inventors in connection with the present invention has been reported in literature both at home and abroad in articles written by the inventors and their assistants.

It has been found that an active therapeutic agent or agents for beneficially stimulating blood cell production is obtainable from normal gastric contents by proper treatment and concentration. It is to be understood that in this description pure gastric juice is intended to be included in the term "gastric contents" when not otherwise distinguished. The fundamental discovery of this invention is the fact that gastric juice and gastric contents contain a product or products for these and allied purposes and which can be concentrated or isolated by the proper application of the art.

According to various modifications of the treatment of gastric contents and the concentration thereof, it appears possible to isolate a factor which is active both for the stimulation of red cell formation and of white cell formation. The scope of the invention is therefore not to be considered as limited to a product or fraction active for both purposes since it appears that fractions can be isolated which display one type of activity predominantly or perhaps singly.

Since no fraction has been as yet isolated which can be regarded as a pure compound, it is impossible to state completely and accurately the chemical properties of the active substance or substances, and it is to be appreciated that they may be in the isolated condition in some respects, different from the properties evidenced by the concentration products thus far successfully used. The substance or substances are believed to be thermolabile, and are not volatile under conditions and temperatures used in their isolation, and further the substance or substances are at least partially dialyzabile through collodion membranes. We have also found that the active principle or fraction for the stimulation of red cell formation may have its activity destroyed by high heat while that which stimulates white cell formation appears to withstand these high temperatures, e. g. 60° C. to possibly 80° C.

The methods used for preparing the products have been employed clinically in a sufficiently large number of cases to give conclusive evidence of their value. It is to be noted that wide variations have been found in the nature of the raw materials used and it has also been found that the finished products of different batches will vary in degree of potency.

The method of production or isolation, whether one or a plurality of substances is eventually isolated, is fundamentally the same regardless of the type of medical treatment for which the concentrate is applied.

While the disclosure herein refers to gastric contents, it is considered to be a fundamental fact in this invention that the principle or principles isolated occur in pure gastric juice, both human gastric juice and gastric juice from other animals. For purposes of economy and practicality it is believed to be preferable however to isolate the material or materials from crude gastric contents.

Methods will be outlined which have been found capable of producing a concentrated solution of the factor or factors described suitable for parenteral administration.

A simple method consists of a suitable concentration without chemical treatment other than the removal of inactive material which is brought out of the solution during the process of concentration. This method is particularly applicable to the treatment of pure gastric juice. Human gastric juice was aspirated from fasting patients after preliminiary gastric lavage. After filtration through cotton, cheesecloth filters or the like, to remove mucus, the juice was concentrated in vacuo below 40° C. The concentrate was then carefully neutralized to litmus by the addition of a non-poisonous alkali such as solid $NaHCO_3$ or a concentrated aqueous solution of $NaHCO_3$. After testing for sterility the concentrate was used clinically.

A second method, while it can be applied to pure gastric juice has been designed primarily to allow isolation of the principle or principles described from crude gastric contents such as may be conveniently obtained from a slaughter house. While this method has been applied primarily to the gastric contents of swine, it will apply equally well to gastric contents of other species of animals. The stomach contents of swine were collected from freshly slaughtered animals at the abattoir and at once pressed in a mechanical press. The pressed juice was concentrated in vacuo below 40° C. to about one-tenth of its original volume and was then treated with four volumes of an organic solvent such as low boiling alcohols or ketones, or any other organic solvent miscible with water which distills either alone or as a constant boiling mixture with water below 100° C. at atmospheric pressure. The addition of the organic solvent as described results in the precipitation of a varying quantity of inactive material composed chiefly of a mixture of inorganic salts and of protein material. The mixture was filtered, the organic solvent removed in vacuo below 40° C. and the aqueous concentrate further evaporated until its volume represented from two to five per cent of that of the original pressed juice. It was then carefully neutralized with non-poisonous alkali, e. g. NaHCO₃ to approximate neutrality to litmus. This preparation was then further concentrated. The concentration may be carried on to dryness if desired followed by resolution to attain dosage potency. To attain the desired potency in a convenient single dosage quantity of say from three to ten c. c., it may be necessary to concentrate quantities of crude gastric contents varying from one half to six liters. After suitable sterilization, the product is ready for injection.

The materials which have been clinically used have been injected parenterally and have given marked and rapid increases in red blood cell count and in hemoglobin, particularly in cases of pernicious anemia. The substance prepared as described is of some value in related conditions but it has had intensive clinical study only in cases of pernicious anemia since this field presents the greatest need for a new medicament of the type described. The same material which upon injection produces beneficial effects in cases of pernicious anemia has also been demonstrated clinically to produce rapid and marked increases in white blood cell counts in cases of acute or chronic infection accompanied by low white cell count. The repeated clinical trial of successive batches of material has shown that some batches are more active than others in one of these two respects. Although limited opportunity has been had for extended clinical study, it has been found that the material which was concentrated as previously described was also effective in conditions accompanied by an excess of premature blood red cells, thus normalizing the reticulocyte count in cases of hemolytic jaundice. The therapeutic agent of the invention has also been found suitable for use in the treatment of diseases associated with abnormal activity of bone marrow. The product of the invention may be said to have therapeutic powers of stimulating the return to normal of activity of bone marrow.

It has been deemed essential, in order not to destroy the activity of the fraction which stimulates red cell formation, that the concentration and all other steps in the preparation of the product shall be carried on at temperatures not in excess of 40° C. The sterilization, if and when necessary, may be effected by filtration or by such a procedure as treating with alcohol and reconcentration in vacuo as explained. It is to be understood that the methods explained may be varied by those skilled in the art without departing from the scope and spirit of this invention.

What is claimed is:

1. The method of concentrating natural crude gastric liquid contents for the treatment of anemia by parenteral administration comprising the steps of pressing the liquid substance from the stomach contents of freshly slaughtered animals, concentrating the press juice in vacuo below 40° C., then adding an organic solvent which is miscible with water and distills alone or as a constant boiling mixture with water below 100° C. to remove the inactive matter in the nature of inorganic salts and protein material by precipitation and filtration, then neutralizing the concentrate to approximate neutrality to litmus with NaHCO₃, then evaporating to further concentrate to dosage potency and sterilizing it.

2. The method of making a product of value in the therapeutic treatment of diseases associated with abnormal blood composition by parenteral administration, comprising the steps of concentrating the collected liquid from natural crude gastric contents in vacuo below 40° C. with subsequent precipitation of inactive materials with an organic solvent which is miscible with water and distills alone or as a constant boiling mixture with water below 100° C., then neutralizing the resultant product, then further concentrating it to dosage potency and sterilizing at temperatures below 40° C.

3. The method of preparing a medicament of value in the treatment of diseases associated with abnormal blood composition by parenteral administration comprising the steps of collecting natural crude gastric contents, concentrating the same in vacuo below a temperature that may be destructive to the active principle or principles to a fraction of its original volume, then precipitating inactive materials from the concentrate with an organic solvent which is miscible with water and distils alone or as a constant boiling mixture with water below 100° C., then filtering the mixture and removing the solvent in vacuo and evaporating the aqueous concentrate at a temperature below that which may be destructive to the active principle or principles to a volume representing dosage potency, then neutralizing the concentrate to approximate neutrality to litmus, then sterilize.

4. A composition for stimulating blood cell formation in the treatment of pernicious anemia by parenteral administration comprising a substantially neutral purified concentrate of the juice obtained from natural gastric contents.

5. A composition for stimulating normal blood cell formation in the treatment by parenteral administration of diseases associated with abnormal blood composition comprising a substantially neutral purified concentrate of the juice obtained from natural gastric contents.

6. A composition for stimulating normal white blood cell formation in treatment of diseases of the blood by parenteral administration comprising a substantially neutral purified concentrate of the juice obtained from natural gastric contents.

ROGER S. MORRIS.
JOHN H. FOULGER.